United States Patent
Kronick

(10) Patent No.: US 8,473,586 B2
(45) Date of Patent: Jun. 25, 2013

(54) METHOD FOR DETERMINING AESTHETIC PREFERENCES TO DEFINE A STYLE GUIDE AND TRANSFORMING A PRESENTATION BASED THEREON

(75) Inventor: Steven Kronick, Malibu, CA (US)

(73) Assignee: Visual Targeting Corporation, Malibu, CA (US)

( * ) Notice: Subject to any disclaimer, the term of this patent is extended or adjusted under 35 U.S.C. 154(b) by 337 days.

(21) Appl. No.: 12/030,047

(22) Filed: Feb. 12, 2008

(65) Prior Publication Data

US 2008/0222239 A1 Sep. 11, 2008

Related U.S. Application Data

(60) Provisional application No. 60/900,995, filed on Feb. 13, 2007.

(51) Int. Cl.
*G06F 15/177* (2006.01)
*G06F 3/00* (2006.01)

(52) U.S. Cl.
USPC .......................................... 709/220; 715/866

(58) Field of Classification Search
USPC ................... 709/202, 220; 715/744, 765, 866
See application file for complete search history.

(56) References Cited

U.S. PATENT DOCUMENTS

| | | | |
|---|---|---|---|
| 6,434,604 B1 * | 8/2002 | Harada et al. | 709/207 |
| 6,957,390 B2 * | 10/2005 | Tamir et al. | 715/744 |
| 2003/0063779 A1 * | 4/2003 | Wrigley | 382/116 |
| 2003/0090506 A1 * | 5/2003 | Moore et al. | 345/730 |
| 2004/0196293 A1 * | 10/2004 | Fernandez et al. | 345/581 |
| 2005/0050150 A1 * | 3/2005 | Dinkin | 709/207 |
| 2005/0261953 A1 * | 11/2005 | Malek et al. | 705/10 |

OTHER PUBLICATIONS

International Search Report and Written Opinion of the International Searching Authority for PCT/US 08/53783 dated Jul. 25, 2008 (8 sheets).

* cited by examiner

*Primary Examiner* — Brian J Gillis
(74) *Attorney, Agent, or Firm* — Leason Ellis

(57) ABSTRACT

A method for determining visual preferences and defining a design based on the ascertained visual preferences. The method includes administering a questionnaire over a computer network, collecting selections made in response to the network and processing the selections into a style-guide. The visual preferences encoded in the style guide can be used to define presentations, customize messages, or be matched to existing images, allowing effective and cost effective development of designs.

6 Claims, 12 Drawing Sheets

| | age | |
|---|---|---|
| 10% | 1-20 | GDW-CEFOS1 |
| 47% | 21-40 | GDW-CEMOY2 |
| 23% | 41-60 | GDW-TEBOY3 |
| 12% | 61-80 | OSW-TVMAS1 |
| 8% | 80+ | G-CELCY3 | sample size: 1875
respondents: 1000

| | gender | |
|---|---|---|
| 43% | Male | GDW-TEBOY3 |
| 57% | Female | GDW-CEFOS1 |

| | income USD | |
|---|---|---|
| 23% | 0-25k | GDW-TEBOY3 |
| 57% | 25-50k | GDW-CEFOS1 |
| 14% | 50-100k | OW-TEFOY1 |
| 10% | 100-150k | GW-CEMAS1 |
| 6% | 150k+ | GSW-TVLSY3 | dictionary

| A | Asymmetrical | F | Fine Lines | Q | Square Shapes |
| B— | Blue First | G | Green First | R | Red First |
| —B | Boldness | H | Horizontal Orientation | S | Simple |
| C— | Cold Colors | L | Light Colors | T | Triangular Shapes |
| —C | Circular Shapes | M | Medium Thickness | V | Vertical Orientation |
| D | Dark Colors | O— | Orange First | W | Warm Colors |
| E— | Grey First | —O | Somewhat Complex | X | Very Complex |
| —E | Equilateral Orientation | P | Purple First | Y— | Yellow First |
| | | | | —Y | Symmetrical |
| | | | | 1 | Small Sizes |
| | | | | 2 | Medium Sizes |
| | | | | 3 | Large Sizes | what is it?  visions:  new  pending  completed  tell a friend  get stylepoints  blog

| | 1 | 2 | 3 | 4 | 5 | 6 | 7 | 8 | 9 |
|---|---|---|---|---|---|---|---|---|---|
| pantone | 277-1 | BLACK | WHITE | 35-1 | 325-2 | 1-7 | 167-1 | 60-1 | 232-7 |
| cmyk | 100,0,100,40 | 0,0,0,100 | 0,0,0,0 | 0,50,100,40 | 0,0,0,85 | 0,0,40,0 | 50,100,0,40 | 0,90,100,0 | 25,0,0,0 |
| rgb | 0,114,54 | 0,0,0 | 255,255,255 | 163,98,9 | 76,77,79 | 255,249,173 | 99,44,96 | 239,65,35 | 185,229,250 |
| html | 007236 | 000000 | FFFFFF | A36109 | 4C4D4F | FFF9AD | 620460 | EF4123 | B9E5FA | what is it? | visions: | new | pending | completed | tell a friend | get stylepoints | blog

METHOD FOR DETERMINING AESTHETIC PREFERENCES TO DEFINE A STYLE GUIDE AND TRANSFORMING A PRESENTATION BASED THEREON

This application claims priority pursuant to 35 U.S.C. §119 from U.S. Provisional Patent Application No. 60/900,995 entitled "Method and Technique for Eliciting and Defining an Individual or Group's Visual and Aesthetic Style Preferences, as Well as for Analysis of any Visual for its Effectiveness at Appealing to any Audience, and for Formulating Guidelines for Matching any Individual or Group's Visual and Aesthetic Style Preferences," filed Feb. 13, 2007, the entire disclosure of which is hereby incorporated by reference.

FIELD OF INVENTION

The present invention relates to aesthetics, and in particular to determining visual and aesthetic preferences of a user or a demographic through user interaction over a computer network.

BACKGROUND OF THE INVENTION

Companies invest heavily developing visual designs to represent the company. These designs can be used to promote the company and its products, attract potential employees for recruiting purposes, etc. These visual designs include advertisements, packaging, trademarks, logos, products, labels, Internet websites, etc. Companies typically employ professionals to bring their own creative ability and practical understanding of the company's business and targeted audience to create effective visual designs. However, effective visual designs can be difficult to design. Effective visual designs are generally ones that incorporate the visual preferences of a targeted audience so that the audience is attracted to the design and thus drawn to the design in some manner. However, the visual parameters and preferences of the audience that need be incorporated into the design to make it more effective are not always clear. Furthermore, a designer may have visual preferences, and may intentionally or subconsciously implement these preferences into a design rather than incorporating the preferences of the target audience.

Therefore, in order to develop an effective design, it is important to ascertain and incorporate the visual preferences of the target audience. Although every person may have his or her own innate visual preferences, inclinations, and likings, it is often difficult to specify these visual preferences. Furthermore, many who are aware of their own visual preferences may still find it difficult to articulate their preferences. Knowledge of such preferences, however, can assist in predicting whether a given design concept would be successful with a certain individual or demographic. Thus, the ability determine visual preferences and characterize them in a usable format is valuable to any person or entity involved in visual design.

SUMMARY OF THE INVENTION

One aspect of the present invention is directed to a computer implemented method for defining a presentation format to a demographic where a questionnaire is distributed to a representative of the demographic at a terminal over a distributive computer network. The questionnaire presents a series of interactive style parameters to the representative from which the representative makes selections. These selections are transformed into an integrated passcode that is representative of the individual selections, and the passcode is output over the distributive computer network.

Another aspect of the present invention is directed to a computer implemented method for presenting a message having a defined set of style parameters to a targeted demographic across a distributed computer network by first retrieving a passcode associated with the demographic. The passcode is decoded using a computer processor to obtain a defined set of style parameters. The set of style parameters is used to transform the one or more presentation parameters included in the message, and the transformed message is conveyed to the targeted demographic.

Yet another aspect of the present invention is directed to a computer implemented method for defining a style-guide associated with an individual having one or more visual preferences where a questionnaire is presented to an individual at a terminal connected to a computer network. The questionnaire provides the individual with a plurality of interactive visual representations, and the selections made by the individual in response to the visual representations are received at a computer. The visual representations are processed by hierarchically valuing them in accordance with an order of interaction with the questionnaire, and the hierarchical values are mathematically combined to define a set of style parameters, and the style parameters are output through a computer network as a style-guide for use by an end-user.

Yet another aspect of the present invention is directed to a computer implemented method for presenting a message having modifiable style parameters to a targeted demographic, where a style guide associated the targeted demographic is retrieved, and code is executed to assign values to the modifiable style-guide parameters according to the retrieved style associated with the targeted demographic, which is stored in computer memory. The message is then modified according to the style parameters to define a customized message, and the customized message is conveyed to the targeted demographic.

Yet another aspect of the present invention is directed to a method for defining a style guide associated with an image that has one or more visual elements, where the image is analyzed, and at least one visual element is extracted from the image. The extracted element is associated with at least one style parameter, which is hierarchically valued in an order of prominence. The hierarchical values are translated to define a set of style parameters associated with the image, and the set of style parameters is output as the style guide.

BRIEF DESCRIPTION OF THE DRAWING FIGURES

The present invention will be more readily understood from the detailed description of exemplary embodiments presented below considered in conjunction with the accompanying drawings, in which:

FIG. 7 is an illustration of exemplary passcodes allocated among several demographic data according to a further aspect of the present invention;

FIG. 10 is an illustration of a preferred color palette that can be utilized in embodiments of the present invention;

DETAILED DESCRIPTION OF CERTAIN ILLUSTRATIVE EMBODIMENTS

Figure 1:
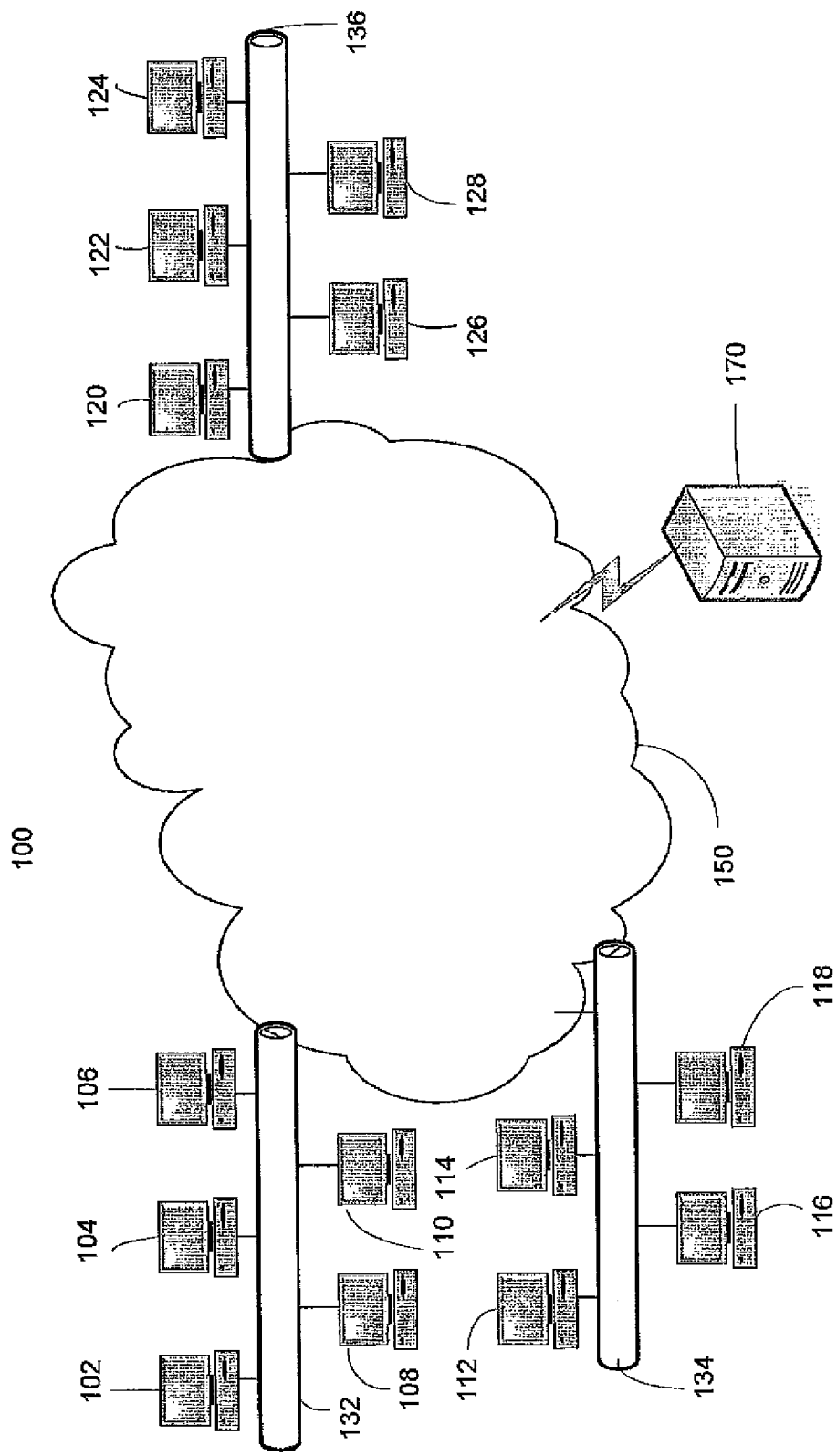
FIG. 1 is an illustration of an exemplary arrangement of a computer network that may be utilized to implement the method of the present invention.

FIG. 1 is an illustration of a distributed computer network 100 that can be used to implement the present invention. The network 100 can include computing terminals 102-128. Each computing terminal 102-128 can support one or more users. The computing terminals 102-128 comprise include personal or laptop computers ("PC"), workstations, thin clients, hand-held devices, or any other type of computing devices. Each computing terminal 102-128 includes at least one processor, display, memory, and storage. The computing terminals 102-128 can be networked, as shown through the network connections 132, 134, 136, and the network cloud 160, to allow the various components to communicate with each other and other networks. The network connections 132, 134, and 136 can include intranets, local area networks ("LAN"), wide area networks ("WAN"), etc. Furthermore, the network connections 132, 134, and 136 can be implemented through wired or wireless connections. In wired form, the network connections can be implemented through RJ-45 Ethernet connections, T-carrier line, fiber optics, coaxial cable, etc. The network cloud 150 can be an extension of an intranet, a LAN, or it can represent the Internet. The computer network 100 can also include a server 170. The server 170 can be virtually any computing device, and includes a processor, memory and storage. The server 170 can also be connected to the network 100 through nearly any of the types of connections described above.

A questionnaire (not shown) as used in the processor discussed below can reside in the storage of the server 170. The questionnaire can be any interactive presentation that is designed to elicit selections from a user. The selections include any response or reaction the user has when presented the questionnaire. This can include affirmative selections made in response to the questionnaire (e.g., positive preferences, etc.), or information collected from selections not made or un-preferred (e.g., negative preferences, etc.). These selections are subsequently used to determine certain preference of the users. The preferences that are determined can include positive preferences such as the user's likes, as well as negative preferences such as the user's dislikes. The questionnaire can comprise a visual preference test that includes a plurality of visual representations of interactive style parameters. The questionnaire is presented to at least one user, and the user is prompted to make selections in response to the visual representations. Based on these selections, certain visual preferences of the user are determined. The plurality of visual representations takes the form of slides presented on at least one of the computing terminals 102-128. For example, in a situation in which a company wants the visual preferences of a certain demographic for a new marketing campaign, the company distributes the questionnaire over the network 100, and presents the questionnaire to individuals (not shown) stationed at least one the computing terminals 102-128. Additionally, the questionnaire can also include a slide to collect each user's demographic information. As individuals make selections in response to the questionnaire, the responses are received, stored, and processed over the network 100, and this raw data is transformed into a style guide which includes a passcode, and can additionally include a preferred color palette, a contrasts-preference indicator and a demographics indicator.

In part, the determined visual preferences include the passcode referenced above. The passcode is a symbolic representation of various visual preferences that is determined based on selections made in response to the questionnaire. The passcode can be a 10 character alphanumeric string that includes preferences for color, hue, saturation, temperature, brightness, shape, orientation, line thickness, complexity, symmetry, and size. Alternatively, the passcode can be as different transformation of the selections made by the user. A preferred color palette is a visual and textual representation of a user's color preferences. An exemplary implementation of this inventive process can include relative preferences for certain colors, and their corresponding pantone, cmyk, rgb, and html color codes. The contrasts-preference indicator, if provided, is a symbolic and textual representation of a user's preferences for various aesthetic aspects such as color temperature, color hue, color saturation, color brightness, orientation, line thickness, complexity, and size. An exemplary implementation can include a symbolic and textual representation of relative preferences for the combination of certain contrasts. Moreover, the demographic data allows the style guides for individuals of certain demographics to be combined so that the visual preferences of the demographic as a whole can be ascertained, and presented as a demographics indicator. The transformation of responses into a style guide can be processed at each computing terminal 102-128, or can be performed at the server 170. The style guides generated from responses to the questionnaire can be transmitted back to the requesting company over the network 100, or optionally be stored in a database (not shown) on the network 100, so that the company, and subsequent companies, can access the information.

Figure 2:
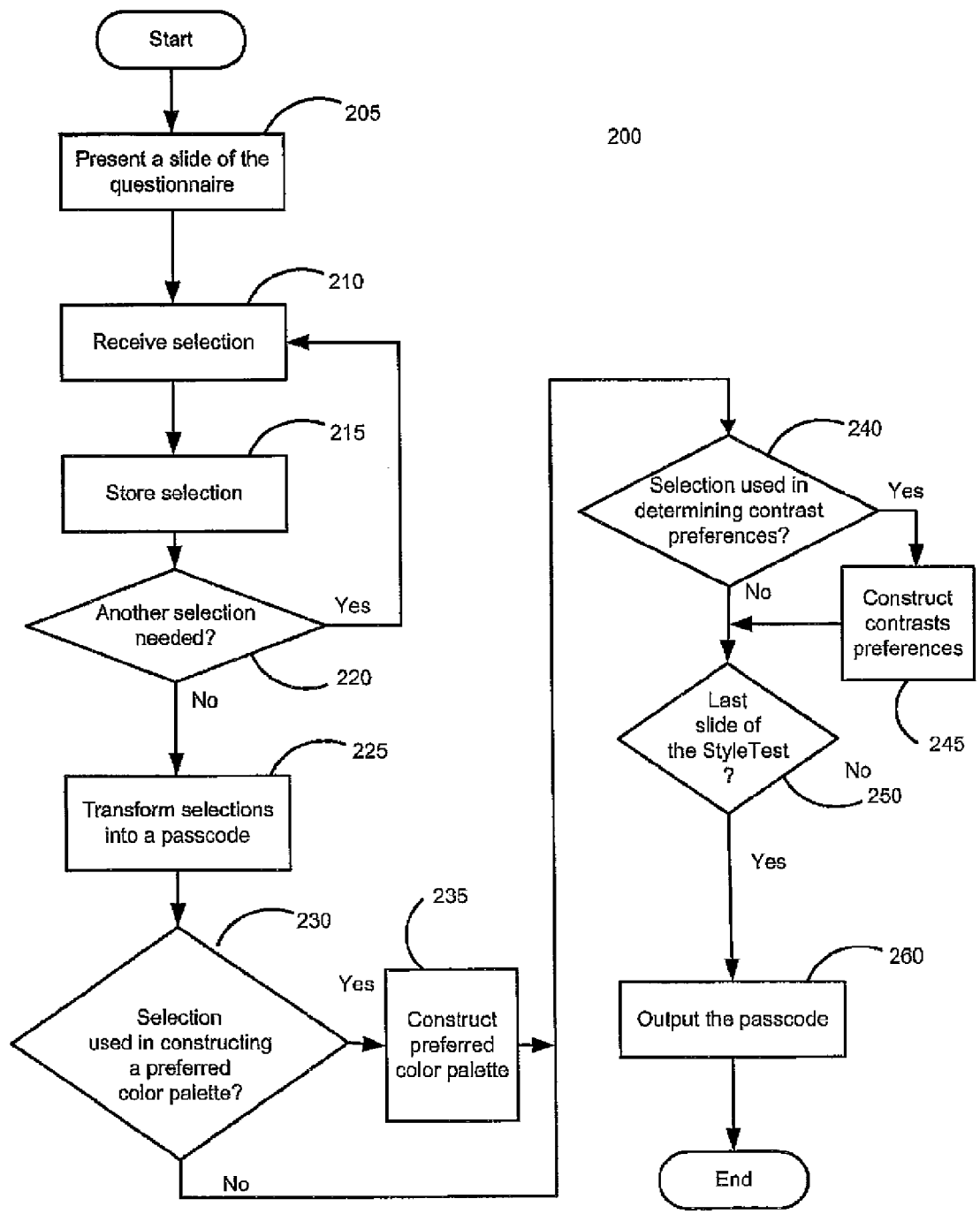
FIG. 2 is a flow diagram illustrating steps in accordance with one aspect of the present invention.

FIG. 2 is an exemplary flow diagram of a method 200 according to one embodiment of the present invention. The method illustrates the steps that can be performed in administering a questionnaire for determining visual preferences and transforming selections in response to the questionnaire into a passcode. Although the steps and processes of the method 200 will be described with respect to the network 100, the method 200 is not confined to the network 100, and is merely an exemplary embodiment according to the present invention.

In an exemplary process flow, the questionnaire is administered to two users at computing terminals 102 and 104. During step 205, the users are presented with one slide of a plurality of slides that make up the questionnaire on a display of the computing terminals 102 and 104. The slide can be transmitted from the server 170 to the computing terminals 102 and 104, or, the entire questionnaire can be transmitted to the computing terminals 102 and 104, and the processor of each computing terminal can process the presentation of each slide. Each slide includes various style parameters or interactive visual representations that require at least one selection from each user taking the questionnaire. In step 210, the users make their respective selections in response to the slide at the computing terminals 102 and 104. These responses are received by the computing terminals 102 and 104, and can also be transmitted over the network 100 to the server 170. During step 215, each response is stored, either at the computing terminals 102 and 104 or at the server 170. Storage can be in a file or a table in memory, or a database. After the selection has been stored, it is determined whether the current slide requires the user to make an additional selection in decision block 220. If another selection is required, the method returns to step 210 and repeats until no further selections are required for the current slide.

After the user has made all selections for a given slide, the selections can be transformed into at least a portion of a passcode associated with the user during step 225. Alternatively, all the selections from all the slides of the questionnaire can be stored, and the entire passcode can be generated after the completion of the entire questionnaire. The passcode is generated through the application of statistical formulas and interpretive algorithms that are applied to the various selections made by the user. Although the formulas and algorithms depend on the style parameter that is being transformed into the passcode, they are based on the frequency of selections, the order in which the selections are made, and the relationship between the various selections. Optionally, transformations into the passcode can combine responses from several slides. After the transformation is performed, during decision blocks 230 and 240 it is determined whether the visual preferences ascertained from the user's selections are used in constructing a preferred color palette and a contrasts-preference indicator portions of the user's style guide. If the visual preference is to be used in determining either, the selections are used in generating the respective components during steps 235 and 245. After the determinations have been made with respect to the preferred color palette and contrasts-preference indicator, during step 250 it is determined whether subsequent slides exist in the questionnaire. If more slides are available, the method returns to step 205 and the entire process is repeated. If all the slides of the questionnaire have been administered, the passcode is output in step 260. This can include transmitting the passcode to the server 170, or to the requesting company over the network 100 or by some other means.

Figure 3:
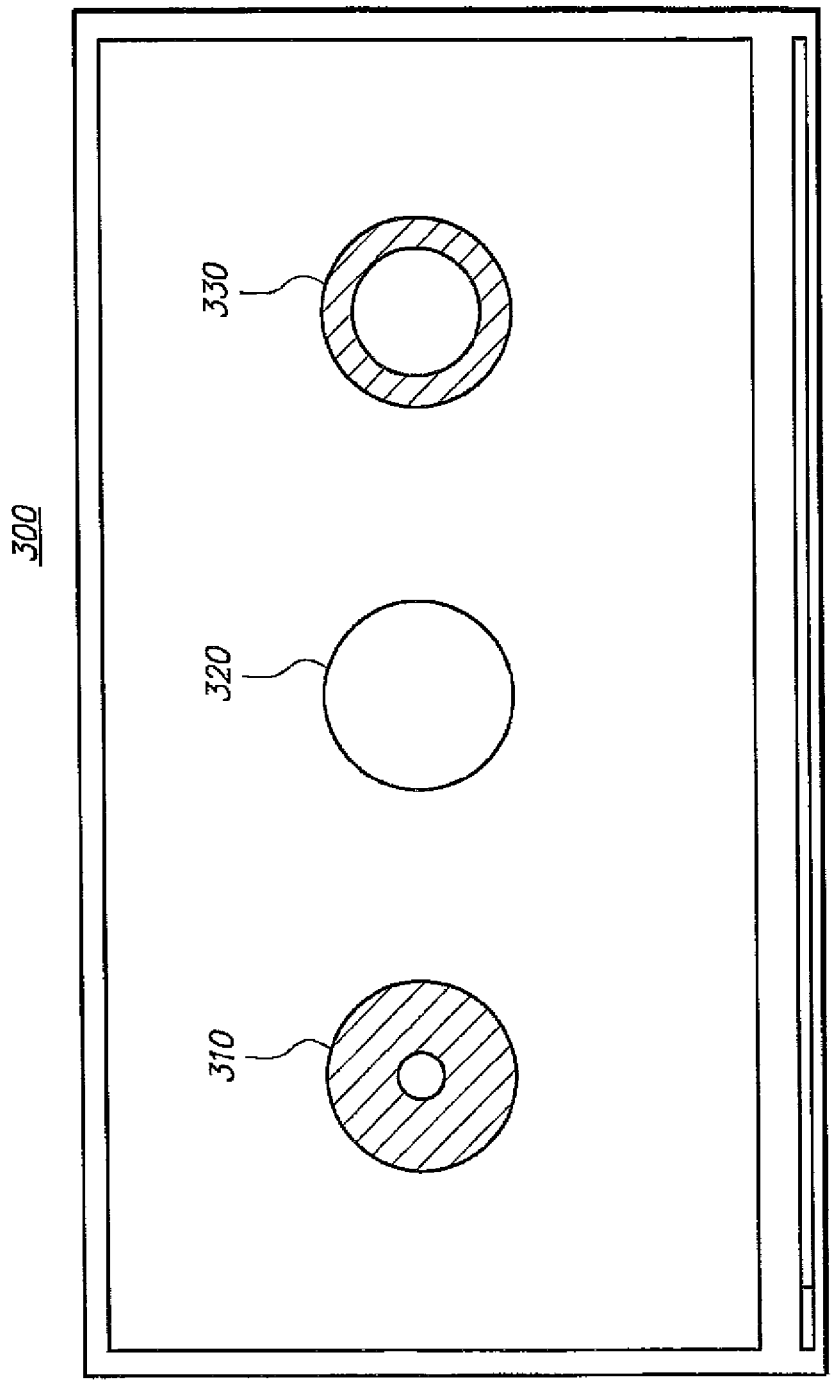
FIG. 3 is an illustration of a first exemplary screen-shot that may be used in connection with a questionnaire constructed in accordance with the present invention.

FIG. 3 is an exemplary illustration of a particular screen shot of a slide 300 that is part of a questionnaire that can be used in an implementation of the present invention. The illustration in FIG. 3 includes three round shapes, 310, 320, and 330. The slide 300 can be presented to a user during step 205 of the method 200 on a display of any of the computing terminals 102-128. Based on the user's visual preferences, a user selects any of the three shapes 310-330. After this selection has been received and stored, the user makes a second selection, choosing from the two unselected shapes. These two selections allow at least one aspect of the user's visual preferences to be determined and subsequently transformed into at least a portion of the style guide associated with the user. The user's selections can be used in determining a portion of the user's passcode, color palette and/or contrasts-preferences.

Figure 4:
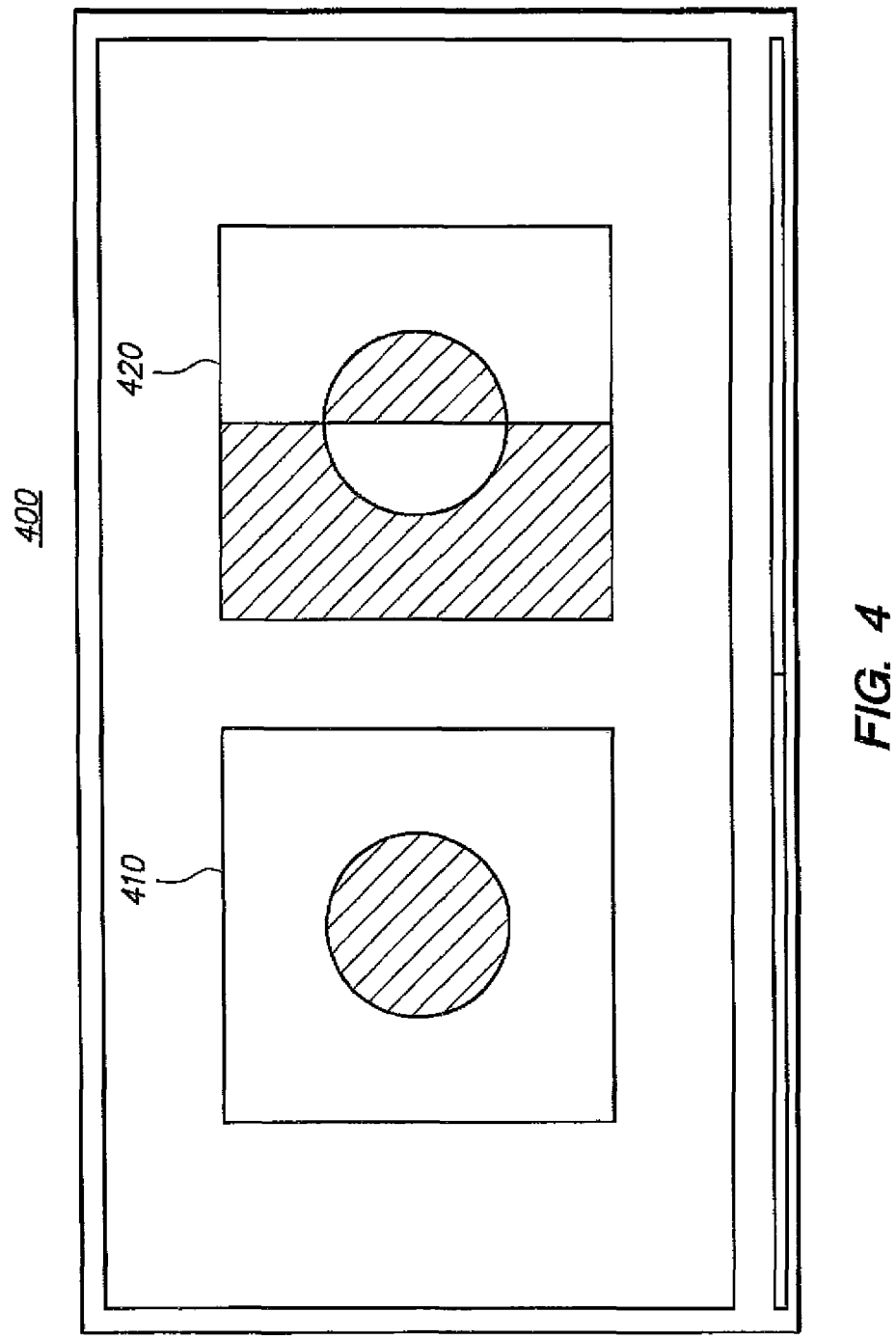
FIG. 4 is an illustration of a second exemplary screen-shot that may be used in connection with a questionnaire constructed in accordance with the present invention.

FIG. 4 is an exemplary illustration of another screen shot of a slide 400 that can be used in a questionnaire according a particular implementation of the present invention. The illustration in FIG. 4 includes two shapes 410, and 420. The slide 400 can be presented to a user during step 205 of the method 200 on a display any of the computing terminals 102-128. Based on the user's visual preferences, a user selects either of the two shapes, 410 or 420. The selection allows at least one aspect of the user's visual preferences to be determined, and subsequently transformed into at least a portion of the style guide associated with the user. The user's selections can be used in determining a portion of the user's passcode, color palette and/or contrasts-preferences.

Figure 5:
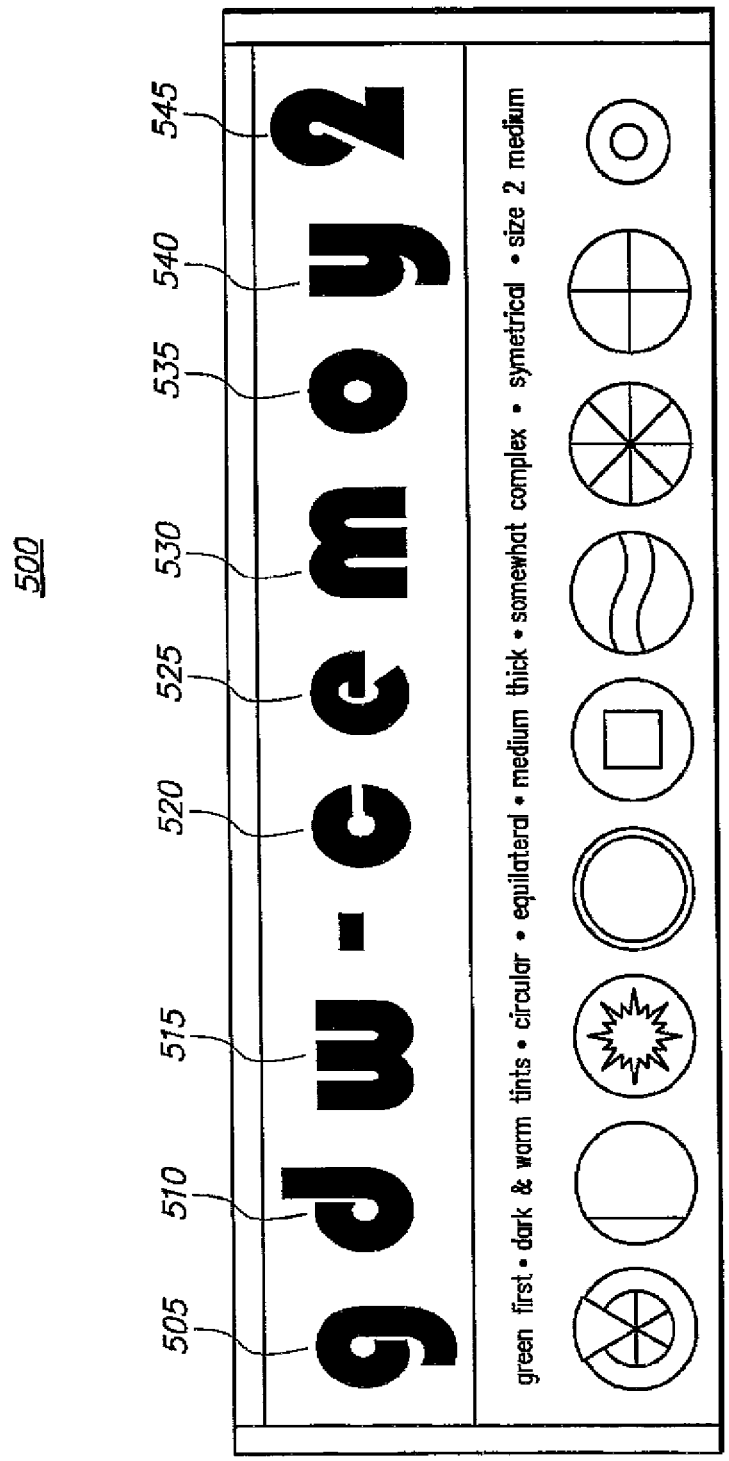
FIG. 5 is an illustration of an exemplary passcode constructed in accordance with one embodiment of the present invention.

FIG. 5 is an exemplary illustration of a passcode 500 that can be included in a style guide constructed in accordance with one aspect of the present invention. The passcode 500 is generated from selections made by a user in response to a questionnaire. The passcode 500 is shown having nine alphanumeric characters 505, 510, 515, 520, 525, 530, 535, 540, and 545. Each of the characters 505-545 is derived from at least a portion of the selections made by the user in response to the questionnaire, and represents a different visual preference of an individual. The character 505 represents the user's dominant color preference; the character 510 represents the user's hue preference; the character 515 represents the user's temperature preference, the character 520 represents the user's shape preference; the character 525 represents the user's orientation preference; the character 530 represents the user's line thickness preference; the character 535 represents the user's complexity preference; the character 540 represents the user's symmetry preference; and the character 545 represents the user's size preference. Since the elements of the passcode are discrete elements, it is possible to combine multiple passcodes to generate a tendency passcode that is representative of the visual preferences of a group. This can be particularly useful when attempting to determine the style preferences of a specific demographic, and is described in more detail below. The illustration of FIG. 5 is merely exemplary, and various embodiments of a passcode according to the present invention are possible. Other exemplary embodiments can utilize symbols rather than characters, as shown with the circular shapes 550-590 beneath the text. Other embodiments of the passcode can include any number of characters or symbols to represent any number of visual preferences and style parameters.

Figure 6:
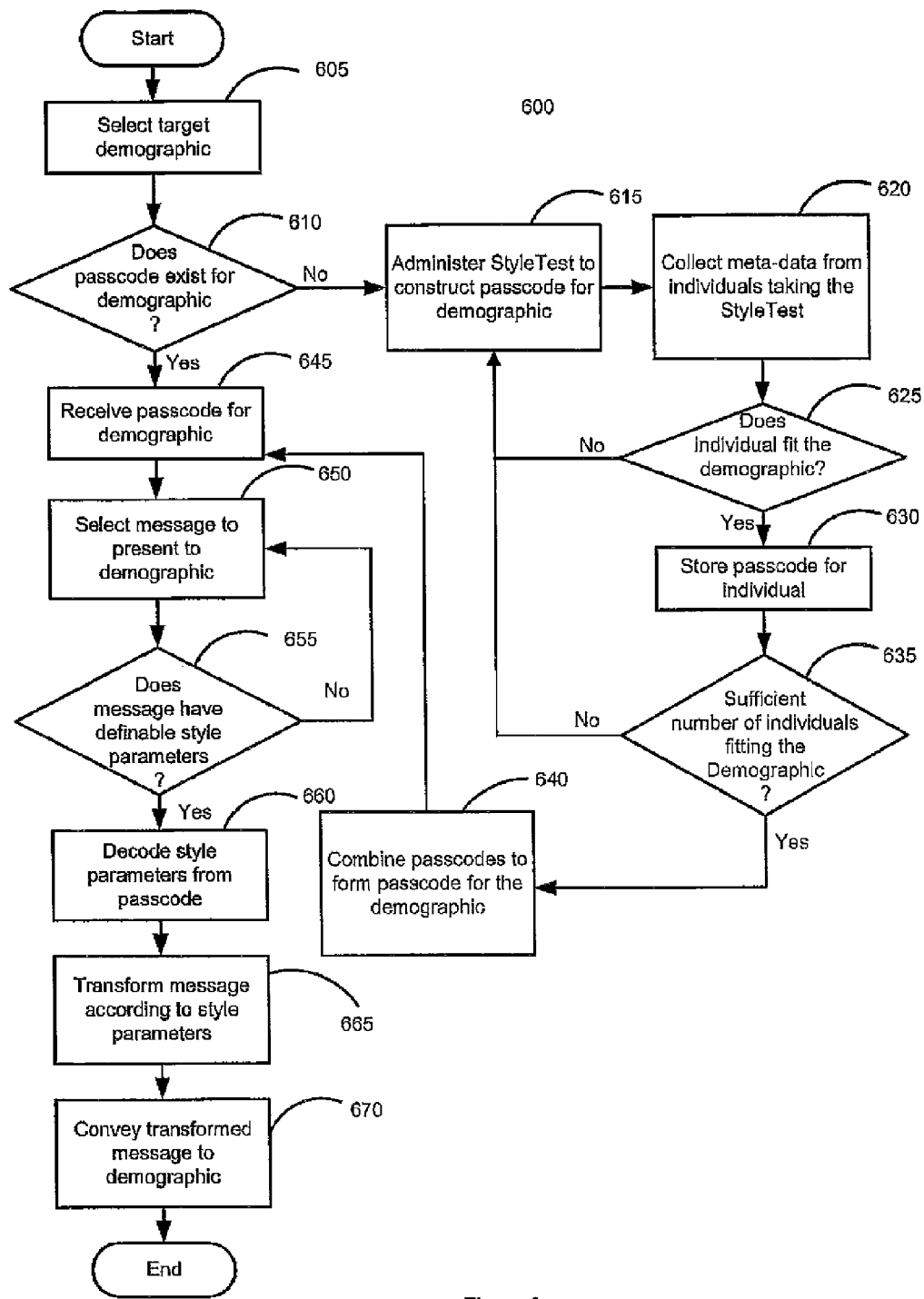
FIG. 6 is a flow diagram illustrating steps in accordance with another aspect of the present invention.

FIG. 6 is an exemplary flow diagram of a method 600 according to the present invention. The method illustrates the steps that can be performed in transforming a message in accordance with visual preferences encoded in a passcode associated with a target demographic. Although the steps and processes of the method 600 will be described with respect to the network 100, the method 600 is not confined to the network 100, and is merely a representative embodiment according to the present invention.

In the method 600, a company can have an advertisement template that it is hoping to target to a specific demographic, or multiple demographics. During step 605, the company decides on the demographic that it wishes to target. In decision block 610, it is determined whether a passcode exists for the targeted demographic. In the situation that a passcode exist for the targeted demographic, the passcode is retrieved over the network 100. The passcode can be stored on the server 170, or in a separate database (not shown). If a passcode does not exist for the desired demographic, during step 615 the company administers the questionnaire to users in order to generate passcodes associated with those users. The administration of the questionnaire can be conducted according to the method 200. During step 620, meta-data regarding certain demographical information pertaining to the users partaking in the questionnaire is collected. The collection of the meta-data can be performed as a part of the questionnaire, or can be performed separate from the questionnaire. The demographic information collected during step 620 allows the company to determine during decision block 625 whether the user falls within the targeted demographic. If the user falls within the targeted demographic, the company stores the passcode associated with the user, as illustrated in step 630. The company continues to administer the questionnaire to users until it has collected a sufficient sampling of the targeted demographic.

After a sufficient number of passcodes from individuals falling within the demographic are collected (as determined at block 635), the passcodes are combined to generate a tendency passcode that is representative of the group during step 640. Since the questionnaire extracts specific visual preferences of users which are used in generating a passcode, the individual elements of the passcodes for the demographic can be combined to generate the tendency passcode that reflects the preferences of the polled individuals as a group. For example, in an embodiment where the passcodes are in the form of passcode 500, the dominant colors for all users are combined into a tendency dominant color preference for the group, the temperature preferences for all users are combined into a tendency temperature preference for the group, the shape preferences of all the users are combined into a tendency shape preference for the group, etc. In combining the passcodes to generate the tendency passcode, interpretive algorithms are applied to the individual elements of all the passcodes. The interpretive algorithms that are applied to each element are based on the frequency and weighted averages of the visual preferences, and differ for each style parameter. In an exemplary calculation where 10 passcodes have been collected to be combined, each passcode can include a temperature preference for each individual. Each temperature preference can also be represented by a numerical value between 0 and 2, where 2 represents a preference for warm colors and 0 represents a preference for cold colors. Thus, the numerical values representing the temperature preferences for the 10 collected passcodes can comprise: 0; 1; 2; 2; 1; 1; 1; 0; 2; 2; and 1. In determining the tendency temperature preference, a threshold is determined, and an average of the collected passcodes is taken. In this example, if a threshold of 1 is selected, since the average of the ten values is 1.3, the tendency temperature preference would indicate that the group has a tendency to prefer warm colors. The threshold can vary depending on the application and the visual preference being combined.

After the representative tendency passcode is generated from the individual passcodes, the company receives the tendency passcode during step 645. The passcode can be transmitted to the company over the network 100, or can be stored on a database (not shown) that the company can access. During step 650, the company selects the message, such as an advertisement or other message, that it wants to disseminate to the target demographic. After it is verified that the message has at least one definable style parameter contained in the tendency passcode, during step 655 the company decodes the tendency passcode to extract the specific visual preferences and style parameters during step 660. These style parameters are applied to the presentation parameters of the message, transforming the message to reflect the preferences of the demographic during step 665. During step 670, the company conveys the message transformed according to the tendency passcode to the demographic over the network 100. Furthermore, in the setting of the Internet, a company can have passcodes for various different demographics stored in a database, and allowing the company to present the appropriate customized messages in real-time depending on the demographic of the visitor to the website. Moreover, in addition to the visual aspects of the message, the advertisement can include sounds and music that can be transformed to match the preferences of the target demographic.

FIG. 7 is an exemplary illustration of a demographics indicator 700 of a style guide that can be constructed in certain implementations of the present invention. The demographics indicator 700 includes various tendency passcodes broken down for various demographics. Each of the various tendency passcodes is the combination of the passcodes of all the individual passcodes associated with the individuals fitting the respective demographic range. The demographics indicator 700 includes tendency passcodes for various age ranges in the block 705, genders in the block 710, and income ranges in the block 715. The demographics indicator 700 also includes a dictionary in the block 720, and the sample side in the block 725. Given this information, any entity is able to create effective designs that match the visual preferences of the various demographics it wishes to target.

Figure 8:
FIG. 8 is an illustration of a third exemplary screen-shot that may be used in connection with a questionnaire constructed in accordance with the present invention.

FIG. 8 is an exemplary illustration of another screen shot of a slide 800 that can be presented in connection with the method of the present invention. This slide 800 can be presented to a user as part of a questionnaire used to obtain visual preferences and generate a style guide. Alternatively, the slide 800 is not required to be part of the questionnaire, but can be administered before the questionnaire as a means to filter the potential users, or can be administered after completion of the questionnaire. The slide 800 includes fields 805, 810, 815, 820, 825, 830, 835, 840, and 845 for the user to input meta-data information so that demographic information associated with the user can be collected. Although the slide 800 is shown with nine fields 805-845, any number of fields can be used, requesting any type of information that is pertinent to the entity administering the questionnaire. The meta-data demographic information allows tendency passcodes to be generated for specific demographics and groups of individuals.

Figure 9:
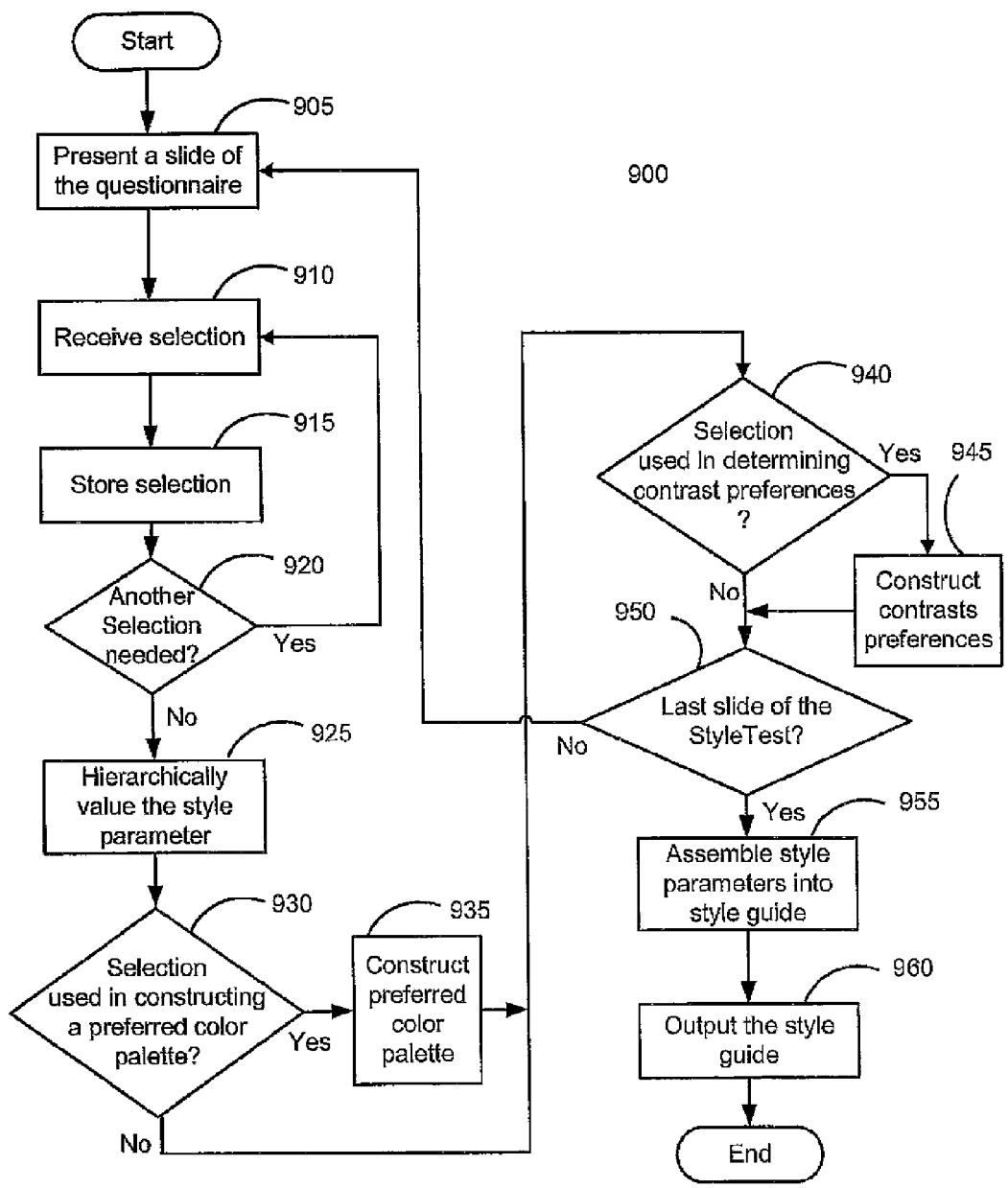
FIG. 9 is a flow diagram illustrating steps in accordance with another aspect of the present invention.

FIG. 9 is an exemplary flow diagram of another method 900 according to the present invention. The method illustrates the steps that can be performed in transforming selections in response to a questionnaire into a style guide. Although the steps and processes of the method 900 will be described with respect to the network 100, the method 900 is not confined to the network 100, and is merely a representative embodiment according to the present invention.

The method 900 is similar to the method 200, but augments the method 200 in including steps to generate a style guide, which includes a preferred color palette and contrasts-preference indicator in addition to a passcode. In the method 900, a user is presented with a slide of a questionnaire during step 905 on a display of the computing terminals 102-128. Each slide includes various style parameters or interactive visual representations that require at least one user selection. In step 910, the users participating in the questionnaire make selections in response to the slide. The selections are received by the computing terminals 102-128, and can be transmitted to the server 170 over the network 100. Each selection represents at least a portion of the user's style parameter preference. During step 915, each response can be stored at each computing terminal 102-128, or each response can be transmitted to the server 170 for storage. After the selections have been stored, in decision block 920 it is determined whether the current slide requires an additional selection by the user. If another selection is required, the method returns to step 910 and repeats until no further selections are required by the current slide. After the user has made all selections for the given slide of the questionnaire, the selections are hierarchically valued based on order of selection, as indicated at block 925.

After these style parameters are hierarchically valued, during decision blocks 930 and 940 it is determined whether the style parameter ascertained from the user's selections are needed in constructing the preferred color palette and contrasts-preference indicator portions of the user's style guide. If the style parameter is to be used in determining either, the selections are mathematically combined to generate the respective components during steps 935 and 945. Generating the preferred color palette includes creating a weighted average for each color based on all of the user's selections relating to color preference during the entire questionnaire. The weights are determined from the order in which the colors are selected. If a given color is selected first, it can be given the greatest weight, and a color selected last can be given the lowest weight. The preferred color palette comprises a ranking of the weighted averages for corresponding to the selected colors. In generating the contrasts-preference indicator, the user's successive selections are monitored to assess the user's preference for contrasts. If the user's successive selections match predetermined sequences, a flag can be set to indicate the user's preference for a specific contrast. The flags are collected and transformed into the contrasts-preference indicator.

After the determinations have been made with respect to the preferred color palette and contrasts—preference indicator, during step 950 it is determined whether subsequent slides exist in the questionnaire. If more slides are available, the method returns to step 905 and the entire process is repeated. If all the slides of the questionnaire have been administered, the style guide, which includes a passcode, the preferred color palette, and the contrasts-preference indicator, is assembled in step 955, and output in step 960. This can include transmitting the passcode to the server 170, or to the requesting company over the network 100 or by some other means.

FIG. 10 is an exemplary illustration of a preferred color palette 1000 which can be part of a style guide, if constructed. The color palette 1000 is generated from the selections made by a user in response to a questionnaire. The preferred color palette 1000 can include a user's relative preferences for certain colors. The color palette 1000 includes colors 1005, 1010, 1015, 1020, 1025, 1030, 1035, 1040, and 1045 in accordance with the color preferences of the user. The colors included in the color palette 1000 are determined from the user selections made in response to the questionnaire. Beneath the relative preferences for the various colors 1005-1045, the pantone codes for each of the colors is given in line 1050, the cmyk codes are given in line 1055, the rgb codes are given in line 1060, and the html codes are given in 1065. These codes are merely exemplary, and the colors can be represented in any format that is desired by the entity requesting the style guide.

Figure 11:
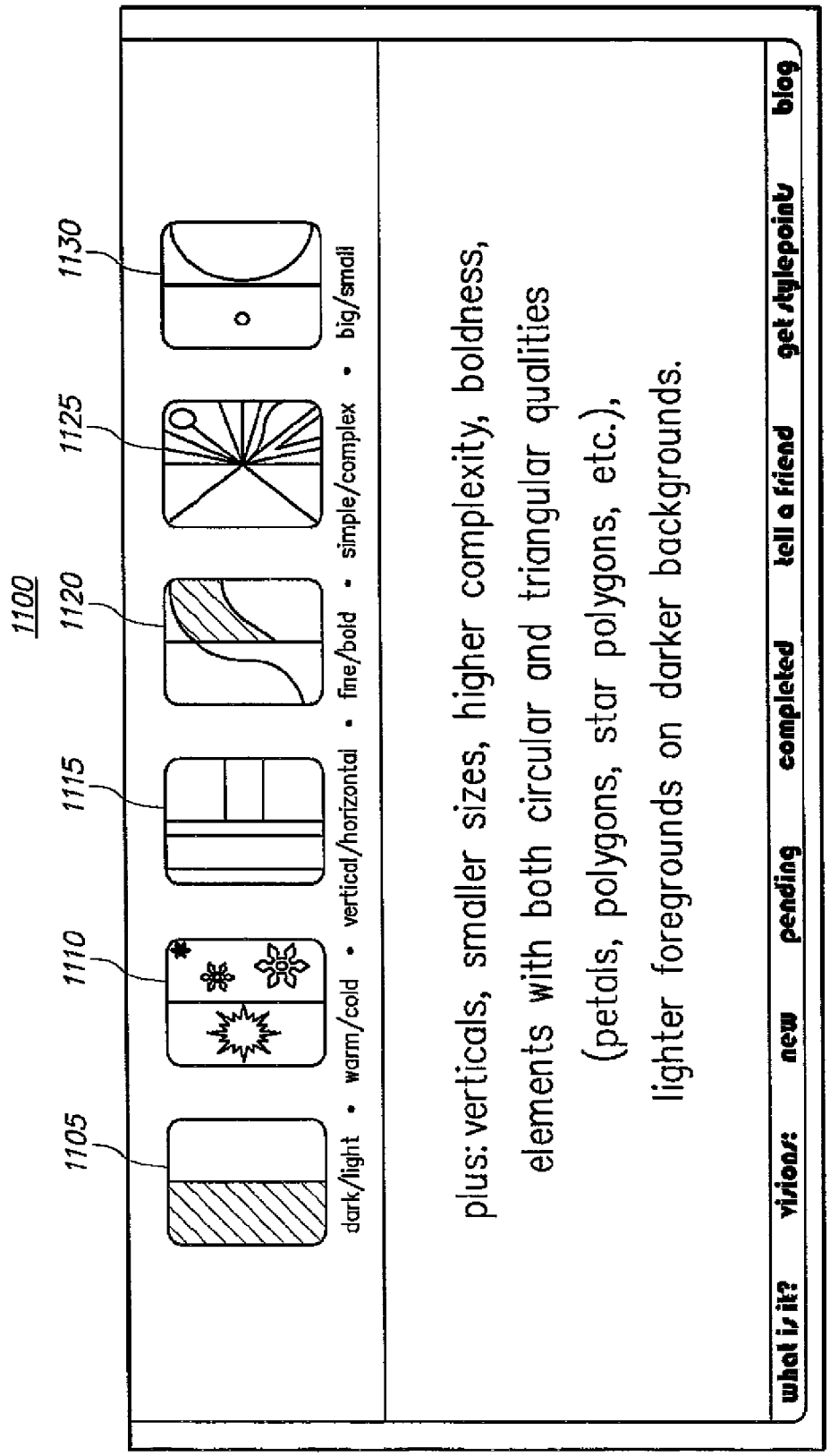
FIG. 11 is an illustration of contrast preferences that can be utilized in embodiments of the present invention.

FIG. 11 is an exemplary illustration of a contrasts-preference indicator 1100 which can be part of a style guide. The contrasts-preference indicator 1100 is generated from selections made by a user in response to a questionnaire. The contrasts-preference indicator 1100 includes any contrasts that the user may be inclined to enjoy. The contrasts-preference indicator 1100 includes contrasts 1105, 1110, 1115, 1120, 1125, and 1130. In the contrasts-preference indicator 1100, the contrasts 1105 indicates that the user has a preference for contrasts between dark and light colors; the contrasts 1110 indicates that the user has a preference for contrasts between warm and cold colors; the contrasts 1115 indicates thai the user has a preference for contrasts between vertical and horizontal orientations; the contrasts 1120 indicates that the user has a preference for contrasts between fine and bold line thicknesses; the contrasts 1125 indicates that the user has a preference for contrasts between simple and complex designs; and the contrasts 1130 indicates that the user has a preference for contrasts between big and small sizes. A contrasts-preference indicator generated for a specific user can have more or less than the contrasts illustrated in FIG. 11, depending on the contrast tastes of the user.

Figure 12:
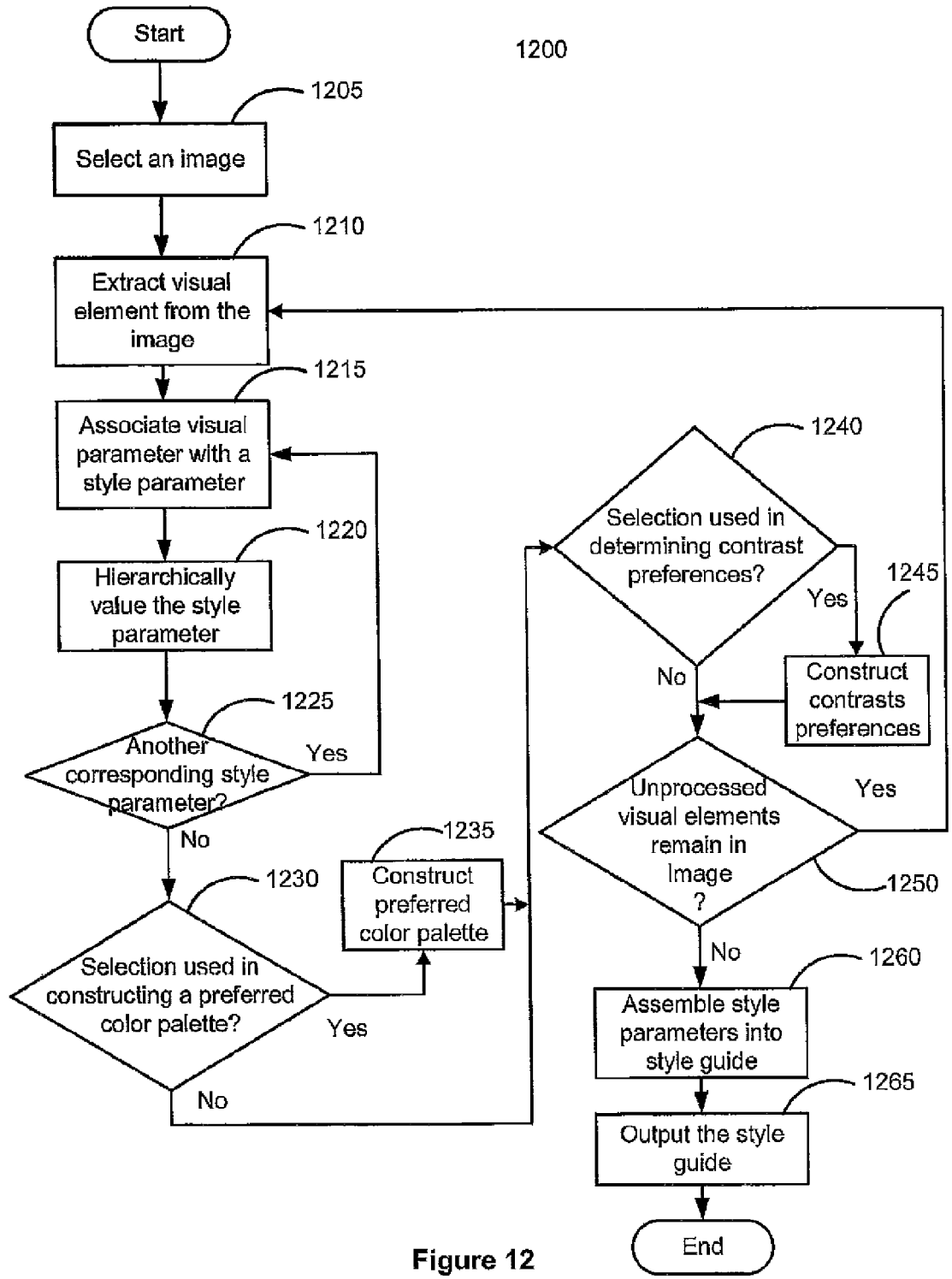
FIG. 12 is a flow diagram illustrating steps in accordance with another aspect of the present invention.

FIG. 12 is an exemplary flow diagram of another method 1200 according to the present invention. The method illustrates the steps that can be included in defining a style guide for an image. Although the steps and processes of the method 1200 will be described with respect to the network 100, the method 1200 is not confined to the network 100, and is merely a representative embodiment according to the present invention. In the method 1200, an image is selected for analysis during step 1205, and analyzed so that at least one visual element is extracted during step 1210. The extraction of the visual elements can include various technologies employing recognition software to discern features and elements from the image. In step 1215, the visual element is associated with a corresponding style parameter. This step can include associating dominant colors, or shapes in the image with corresponding style parameters. The style parameter is then hierarchically valued during step 1220 in an order of relative prominence. The hierarchical valuing can be performed by a software application designed to determine the relative prominence of the visual elements. For example, the software can perform a pixel by pixel analysis to determine the relative prominence of colors included in the image, or the software can utilize shape recognition algorithms to determine the relative prominence of shapes based on factors such as completeness, size, orientation, frequency, etc. Alternatively, the process can be performed manually, where a person can deconstruct the image into visual elements and perform rankings of relative prominence.

Next, decision block 1225 determines whether the extracted visual element can be associated with another style parameter, and if possible, steps 1220 and 1225 are repeated. Otherwise, the method 1200 proceeds similarly to the method 800, and during decision blocks 1230 and 1240 it is determined whether the style parameters ascertained from the extracted visual elements are used in constructing the preferred color palette and contrasts-preference indicator portions of the image's style guide. If the style parameter is to be used in determining either, the selections are mathematically combined, as described above with respect to generating preferred color palettes and contrasts-preference indicators associated with a user, in generating the respective components during steps 1235 and 1245. After the determinations have been made with respect to the preferred color palette and contrasts-preference indicator, during step 1250 it is determined whether subsequent visual elements remain in the image for extraction. If visual elements remain unprocessed, the method returns to step 1205 and the entire process is repeated. If all the visual elements of the image have been processed, the style guide, which includes a passcode, is assembled in step 1260, and output in step 1265. This can include transmitting the passcode to the server 170, or to the requesting company over the network 100 or by some other means.

Additionally, optional steps of matching style guides of users and images can be performed. Since the method 800 produces style guides associated with individuals, and the method 1200 produces style guides associated with images, companies having both style guides can match images to individuals, resulting in the ability to correlate images to people that match their visual preferences, making any image extremely customized and effective.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for presenting a message having one or more presentation parameters to a targeted demographic across a distributed computer network, comprising the steps of:

retrieving a stored passcode associated with the targeted demographic at a computer connected to the distributed computer network;

decoding the passcode, using a processor of the computer, so as to obtain a defined set of style parameters that define the passcode, the passcode being a symbolic representation of visual preferences that is determined based on any selections made in response to a questionnaire presented over the distributed computer network, wherein the passcode comprises an integration of said selections and is representative of visual preferences including at least a color, a shape, and and a contrast preference;

modifying the message by applying the obtained set of style parameters to the one or more presentation parameters included in the message prior to conveying the message across the distributed computer network to the targeted demographic, using the processor of the computer; and conveying a customized message in which the one or more presentation parameters have been defined in the modified message using the applied and obtained set of style parameters to the targeted demographic across the distributed computer network, wherein the conveyed customized message is a transformation of the one or more presentation parameters of the message to reflect the preferences of the targeted demographic.

2. The method as in claim 1, wherein the presentation parameters comprise visual style parameters, audio parameters, or both.

3. A method in a programmed computer for presenting a message having one or more presentation parameters to a targeted demographic, comprising the steps of:

retrieving a stored style guide associated with the targeted demographic into a memory of the computer, the style guide including a preferred color palette, a contrasts-preference indicator, and a passcode, the passcode being a symbolic representation of visual preferences that is determined based on at least some selections made by the targeted demographic in response to a questionnaire presented on a terminal connected to a computer network, wherein the passcode comprises an integration of said selections and is representative of visual preferences including at least a color, a shape, and a contrast preference;

decoding the passcode, using a processor of the computer, so as to obtain a defined set of style parameters that define the passcode;

executing code that assigns values to the one or more presentation parameters according to the style guide and the decoded passcode associated with the targeted demographic in the computer memory;

modifying the message using a processor of the computer so as to define a customized message having the assigned values to the one or more presentation parameters that reflects preferences of the targeted demographic prior to conveying to the targeted demographic; and conveying the customized message in which the one or more presentation parameters have been defined in the customized message to the targeted demographic in a presentation medium.

4. The method as in claim 3, further comprising the step of identifying one or more modifiable style parameters of the customizable message to be acted upon by the revising step.

5. The method as in claim 3, wherein the revising step is performed automatically by the computer.

6. The method as in claim 3, wherein the style guide comprises a passcode that encodes the modifiable style parameters, and wherein the revising step adjusts the modifiable style parameters of the message to visually revise the message to accommodate the modifiable style parameters encoded in the passcode.

* * * * *